(12) United States Patent
Masuda

(10) Patent No.: US 10,593,044 B2
(45) Date of Patent: Mar. 17, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keita Masuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/115,252

(22) Filed: Aug. 28, 2018

(65) Prior Publication Data

US 2019/0066306 A1 Feb. 28, 2019

(30) Foreign Application Priority Data

Aug. 30, 2017 (JP) .................. 2017-166095

(51) Int. Cl.

| G06T 7/13 | (2017.01) |
|---|---|
| G06T 7/90 | (2017.01) |
| G06T 7/73 | (2017.01) |
| G06T 7/507 | (2017.01) |
| G06K 9/48 | (2006.01) |

(Continued)

(52) U.S. Cl.
CPC ............ *G06T 7/13* (2017.01); *G06K 9/00382* (2013.01); *G06K 9/48* (2013.01); *G06T 7/12* (2017.01); *G06T 7/507* (2017.01); *G06T 7/75* (2017.01); *G06T 7/90* (2017.01); *G06K 9/00375* (2013.01); *G06K 9/00671* (2013.01); *G06K 2009/487* (2013.01); *G06T 2207/10024* (2013.01); *G06T 2207/10028* (2013.01); *G06T 2207/30088* (2013.01)

(58) Field of Classification Search
None
See application file for complete search history.

(56) References Cited

U.S. PATENT DOCUMENTS

2013/0342671 A1* 12/2013 Hummel .............. G06K 9/6202
348/77
2014/0334670 A1* 11/2014 Guigues .................. G06T 7/251
382/103

(Continued)

FOREIGN PATENT DOCUMENTS

| JP | 200462757 A | 2/2004 |
|---|---|---|
| JP | 2014106543 A | 6/2014 |

OTHER PUBLICATIONS

Du, Heng, and T. To. "Hand gesture recognition using Kinect." Techical Report, Boston University (2011).*

*Primary Examiner* — Ryan M Gray
(74) *Attorney, Agent, or Firm* — Canon U.S.A., Inc. IP Division

(57) ABSTRACT

An information processing apparatus includes a depth image acquisition unit configured to acquire a depth image from a measurement apparatus that has measured a distance to an object, an image acquisition unit configured to acquire a captured image from an image capturing apparatus that has captured an image of the object, and an estimation unit configured to estimate a shape of the object based on the depth image and the captured image. The estimation unit acquires information about a contour of the object from the captured image, corrects the information about the contour based on the depth image, and estimates the shape of the object based on the corrected information about the contour.

22 Claims, 10 Drawing Sheets

(51) Int. Cl.
    *G06K 9/00*     (2006.01)
    *G06T 7/12*     (2017.01)

(56) References Cited

U.S. PATENT DOCUMENTS

| | | | | |
|---|---|---|---|---|
| 2015/0278589 | A1* | 10/2015 | Mazurenko | G01C 11/30 |
| | | | | 382/103 |
| 2015/0332471 | A1* | 11/2015 | Heo | G06T 7/11 |
| | | | | 382/103 |
| 2017/0140552 | A1* | 5/2017 | Woo | G06F 1/163 |
| 2017/0154215 | A1* | 6/2017 | Niinuma | G02B 27/017 |
| 2017/0154471 | A1* | 6/2017 | Woo | G06T 7/11 |
| 2017/0272724 | A1* | 9/2017 | Lim | H04N 13/15 |
| 2017/0286750 | A1* | 10/2017 | Levinshtein | G06T 7/75 |
| 2018/0047182 | A1* | 2/2018 | Gelb | G06T 19/00 |
| 2018/0225829 | A1* | 8/2018 | Evertt | H04N 5/2226 |
| 2018/0302609 | A1* | 10/2018 | Pacheco | G06T 7/285 |

* cited by examiner

FIG. 6

$Eval = f(W_1 \sigma col + W_2 \sigma dep) | x, y = $ PROXIMITY POINT

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium for estimating a shape of an object.

Description of the Related Art

Research has recently been conducted on Mixed Reality (MR) for superimposing information relating to a virtual space on a physical space in real time. The MR is a technique for displaying a composite image obtained by superimposing images (computer graphics (CG)) in a virtual space according to a position and orientation of an image capturing apparatus on images captured by the image capturing apparatus. When the MR is used to experience the MR with a high sensation of reality, it is important not only to superimpose CG to be displayed on captured images, but also to achieve an interaction between a CG model and a person who experiences the MR. For example, a positional relationship between a CG model and a hand of a person may be grasped. To achieve this, it is necessary to extract an area corresponding to an actual hand from a captured image.

Examples of methods for extracting a hand area (hand shape) include an area segmentation method such as a graph cut, a dynamic contour extraction method such as snakes or a Level Set method, and a learning-base extraction method such as model fitting or feature extraction. In any of the methods, an initial hand area is determined by extracting a skin color in many cases, and thus it is important to register an appropriate skin color database (color table) to achieve a high accuracy. Therefore, a hand area can be accurately extracted as long as skin color information can be accurately registered during initial registration.

However, in these skin color extraction methods, the accuracy deteriorates if the skin color information about the actual hand changes from initially registered skin color information. For example, when a shadow is formed on the hand due to a change in an illumination environment and an irradiation angle of illumination light, the skin color information might change. In other words, the skin color extraction methods are susceptible to an external environment.

Accordingly, in order to accurately extract a specific area, not only the extraction methods using information about a color in a captured image as described above, but also another means may be used.

Japanese Patent Application Laid-Open No. 2004-62757 discusses a technique for preventing a deterioration in the accuracy of detecting a characteristic portion even when the image capturing environment changes. Japanese Patent Application Laid-Open No. 2004-62757 includes a parameter adjustment unit that adjusts a detection parameter by combining a captured image with a position/orientation estimation apparatus.

Japanese Patent Application Laid-Open No. 2014-106543 discusses a technique in which an imaging capturing apparatus and a distance measurement apparatus are combined to reduce an error in the distance measurement apparatus in a case where an object to be measured or the apparatus itself moves. Japanese Patent Application Laid-Open No. 2014-106543 discusses that in order to accurately extract a specific area, it is effective to combine the image capturing apparatus and the distance measurement apparatus.

In order for a person to experience the MR with a high sensation of reality, there is a need to grasp a positional relationship with a CG model by using a hand of the person, or to perform a contact operation. To achieve this, it is necessary to extract a hand area. As a method for extracting the hand area, there is a method of initially registering skin color information about a hand, to thereby extract a hand area. However, if the skin color information changes from the initially registered information, the hand extraction accuracy may deteriorate due to a shadow that is formed due to, for example, a change in an illumination environment or an illumination angle. If the hand extraction accuracy deteriorates, an accurate positional relationship with the CG model cannot be obtained, which leads to a deterioration of reality.

Further, as discussed in Japanese Patent Application Laid-Open No. 2014-106543, a correction using the distance measurement apparatus is effective, but the accuracy of the distance measurement apparatus itself may be insufficient.

SUMMARY

The present disclosure is directed to providing an information processing apparatus capable of improving the accuracy of estimating a shape of an object.

According to an aspect of the present disclosure, an information processing apparatus includes a depth image acquisition unit configured to acquire a depth image from a measurement apparatus that has measured a distance to an object, an image acquisition unit configured to acquire a captured image from an image capturing apparatus that has captured an image of the object, and an estimation unit configured to estimate a shape of the object based on the depth image and the captured image. The estimation unit acquires information about a contour of the object from the captured image, corrects the information about the contour based on the depth image, and estimates the shape of the object based on the corrected information about the contour.

Further features of the present disclosure will become apparent from the following description of exemplary embodiments with reference to the attached drawings.

BRIEF DESCRIPTION OF THE DRAWINGS

FIG. 6 illustrates a weighted evaluation function according to one or more aspects of the present disclosure.

DESCRIPTION OF THE EMBODIMENTS

Exemplary embodiments of the present disclosure will be described in detail below with reference to the accompanying drawings.

Figure 1:
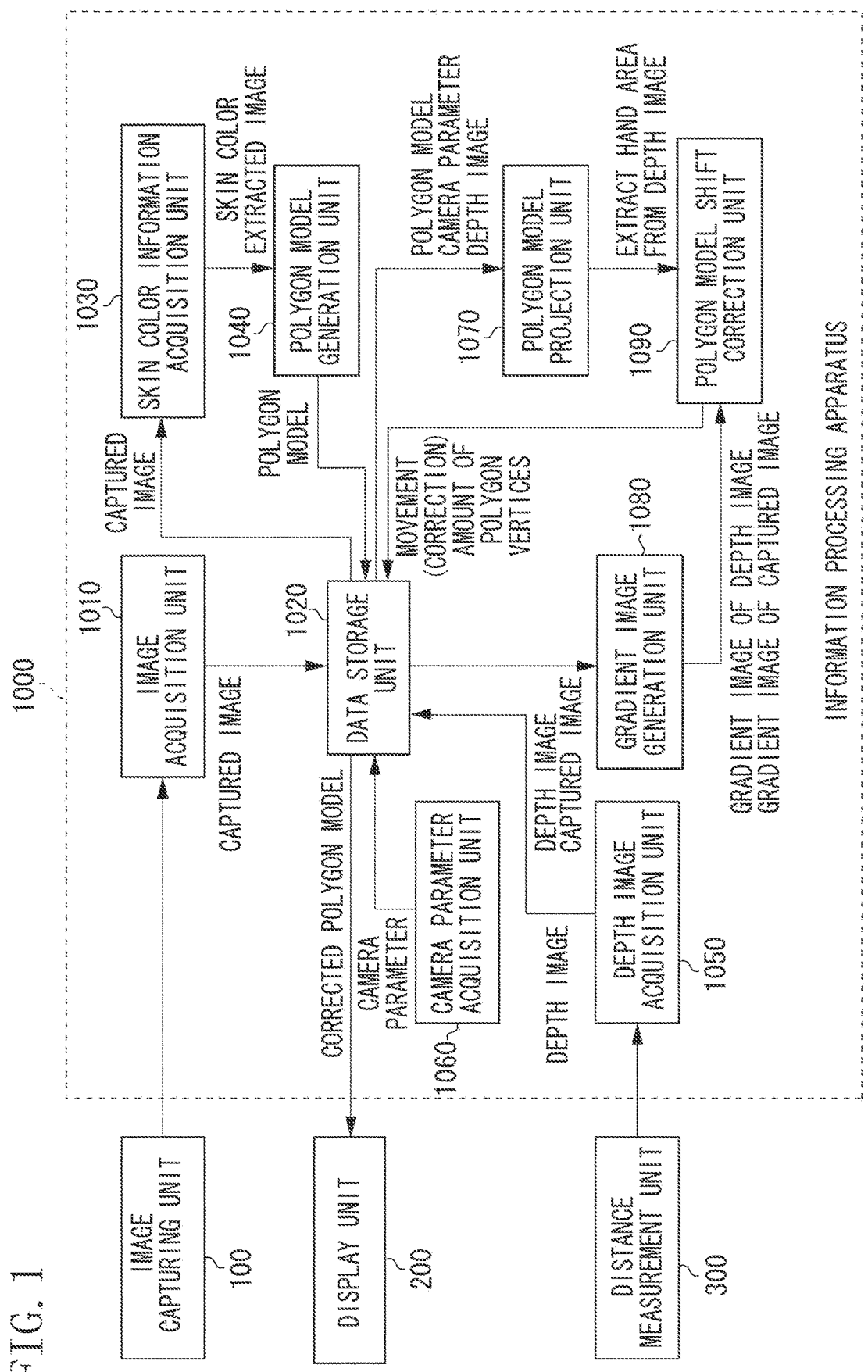
FIG. 1 is a block diagram illustrating a functional configuration example of a system according to one or more aspects of the present disclosure.

FIG. 1 is a block diagram illustrating an information processing apparatus that controls an image capturing apparatus and a distance measurement apparatus according to a first exemplary embodiment.

In the present exemplary embodiment, as illustrated in FIG. 1, an image capturing unit 100, a display unit 200, and a distance measurement unit 300 are each connected to an information processing apparatus 1000. The image capturing unit 100 is, for example, a video see-through head mounted display (HMD) or a network camera. The display unit 200 is, for example, a display such as a head mounted display (HMD) or a personal computer (PC) monitor. The distance measurement unit 300 is, for example, a distance measurement sensor capable of acquiring a depth image.

The information processing apparatus 1000 includes an image acquisition unit 1010, a data storage unit 1020, a skin color information acquisition unit 1030, and a polygon model generation unit 1040. The information processing apparatus 1000 also includes a depth image acquisition unit 1050, a camera parameter acquisition unit 1060, a polygon model projection unit 1070, a gradient image generation unit 1080, and a polygon model shift correction unit 1090. Some of the functions of the information processing apparatus 1000 can be implemented by a general personal computer that operates based on a computer program.

The image acquisition unit 1010 acquires a captured image captured by the image capturing unit 100 and stores the captured image in the data storage unit 1020.

The data storage unit 1020 stores the captured image input from the image acquisition unit 1010 and a polygon model of a hand input from the polygon model generation unit 1040. The data storage unit 1020 also stores a depth image input from the depth image acquisition unit 1050 and a movement (correction) amount of polygon vertices generated by the polygon model shift correction unit 1090.

The skin color information acquisition unit 1030 extracts a skin color area from the captured image acquired by the image acquisition unit 1010. The skin color information acquisition unit 1030 compares the extracted skin color area with preliminarily set skin color information to thereby determine whether each pixel value in the captured image indicates a skin color, and then generates a binary image by extracting an area (hand area) corresponding to a hand shape with the skin color.

The polygon model generation unit 1040 extracts the hand area by extracting the skin color from the skin color information acquisition unit 1030 and generates a polygon model representing the contour of the hand area.

The depth image acquisition unit 1050 acquires the depth image obtained through the measurement by the distance measurement unit 300.

The camera parameter acquisition unit 1060 acquires information about a position and orientation of each of an image capturing camera and the distance measurement apparatus with respect to a preliminarily set reference position, and camera intrinsic parameters (a principal point and a focal length).

The polygon model projection unit 1070 projects the polygon model acquired by the polygon model generation unit 1040 on the depth image acquired by the depth image acquisition unit 1050. Information about the position and orientation of the camera parameter acquisition unit 1060 is required to project the polygon model.

The gradient image generation unit 1080 acquires a depth gradient image on the depth image acquired by the depth image acquisition unit 1050 and a color gradient image from the captured image acquired by the image acquisition unit 1010. A color gradient can be a luminance, an RGB value, or any value depending on color information.

The polygon model shift correction unit 1090 calculates, on the image, a shift amount between a contour position of an actual hand and a contour position of the polygon model from the polygon model projected on the depth image, the gradient image of the depth image, and the gradient image of the captured image. In this case, the polygon model projected on the depth image is projected by the polygon model projection unit 1070, and the gradient image of the depth image is generated by the gradient image generation unit 1080.

<Processing Procedure>

Figure 2:
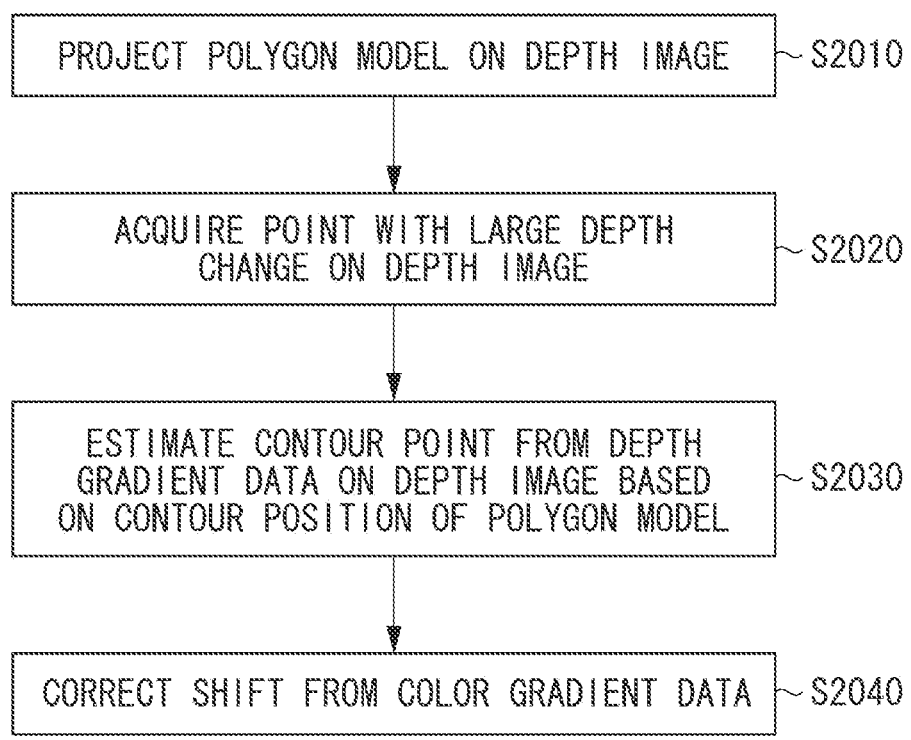
FIG. 2 is a flowchart illustrating an overall operation according to one or more aspects of the present disclosure.
Figure 3:
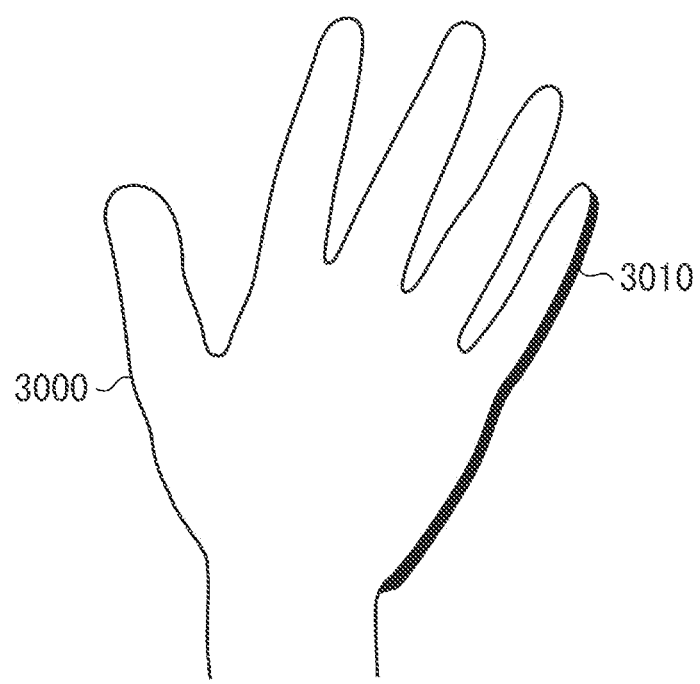
FIG. 3 illustrates a state where an actual hand is affected by a shadow according to one or more aspects of the present disclosure.

FIG. 2 illustrates an overall processing flow of correction processing according to the present exemplary embodiment. FIG. 3 illustrates an example where a shadow is formed on a hand due to an illumination environment. In FIG. 3, a line 3000 indicates the contour of an actual hand, and a black area 3010 indicates a shadow. Accordingly, the contour of the actual hand is present outside the black area. In a skin color extraction method, it is not easy to extract an area corresponding to a shadow area (black area) of an actual hand. Therefore, this issue is solved by using depth information obtained by the distance measurement apparatus.

Step S2010 illustrated in FIG. 2 corresponds to the polygon model projection unit 1070. Skin color information included in the capture image generated by the skin color information acquisition unit 1030 is projected on the depth image, which is acquired by the depth image acquisition unit 1050, based on the information about the position and orientation of each of the image capturing camera and the distance measurement apparatus acquired by the camera parameter acquisition unit 1060. In this processing, the sensor resolution of the image capturing unit 100 need not necessarily match the sensor resolution of the distance measurement unit 300.

Step S2020 corresponds to the gradient image generation unit 1080. In step S2020, a pixel position with a large depth change (a certain threshold or greater) with respect to adjacent pixels on the depth image is acquired.

In step S2030, a real contour point is estimated from depth gradient data acquired in step S2020 based on the contour position of the polygon model projected on the depth image. A specific estimation method will now be described. First, a point with a large depth change is detected from a plurality of pixels located in the vicinity of contour points. In this case, a depth change on the depth image in the hand area is small, and a depth change on the boundary between the inside of the hand area and a background area is large. In other words, it can be estimated that the point with a large depth change corresponds to the contour position of the actual hand. Accordingly, the contour of the polygon model is then moved to the position with a large depth change. However, since the depth change acquired in step S2020 may vary greatly, there is a need to correct a shift by estimating the contour position of the actual hand based on color gradient data.

Figure 4:
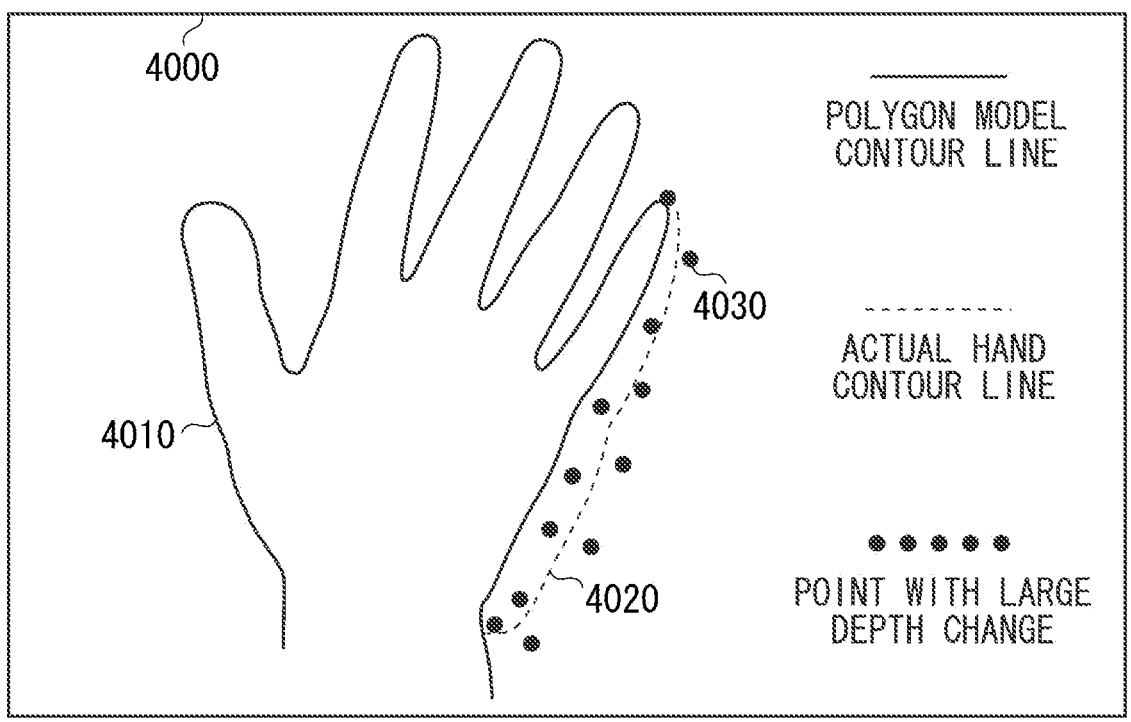
FIG. 4 illustrates a state where a polygon model is projected on a depth image according to one or more aspects of the present disclosure.

In step S2040, a shift from the color gradient data on the captured image with respect to the contour position estimated on the depth image is corrected again. The contour point estimated on the depth image in step S2030 may be inaccurate, for example, when the distance accuracy of the distance measurement apparatus is low, or when the resolution of the distance measurement apparatus is lower than that of the imaging camera. An example of this case is illustrated in FIG. 4. As illustrated in FIG. 4, the polygon model projection unit 1070 projects the polygon model generated by the polygon model generation unit 1040 on a depth image 4000. A line 4010 indicates the contour of the polygon model. A dashed line 4020 indicates the contour position of the actual hand, and black circles 4030 each indicate a gradient position on the depth image generated by the gradient image generation unit 1080. When the accuracy of the distance measurement apparatus is low, or when the resolution of the distance measurement apparatus is low, the estimated contour position may not match the actual contour position. Accordingly, the contour position is estimated based on the depth gradient data and the contour position is further estimated based on the color gradient data on the captured image, thereby making it possible to accurately extract the contour position. The color gradient data indicates a color change amount such as an RGB value or luminance. Therefore, information about a color change with respect to adjacent pixels is acquired instead of skin color information preliminarily registered. This configuration makes it possible to distinguish the boundary position between the hand with a shadow and the background area.

Figure 5A:
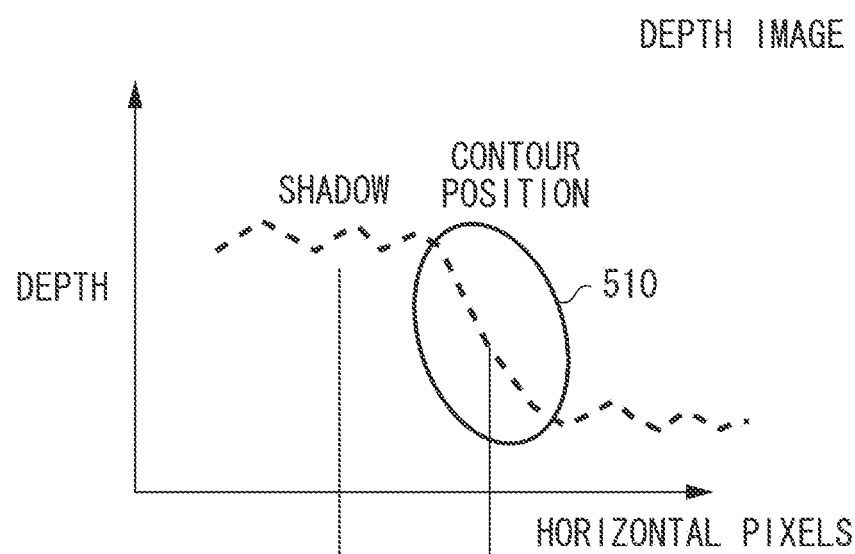
FIGS. 5A and 5B are graphs illustrating a depth and a color change, respectively, with respect to the same position on a depth image and a captured image according to one or more aspects of the present disclosure.
Figure 5B:
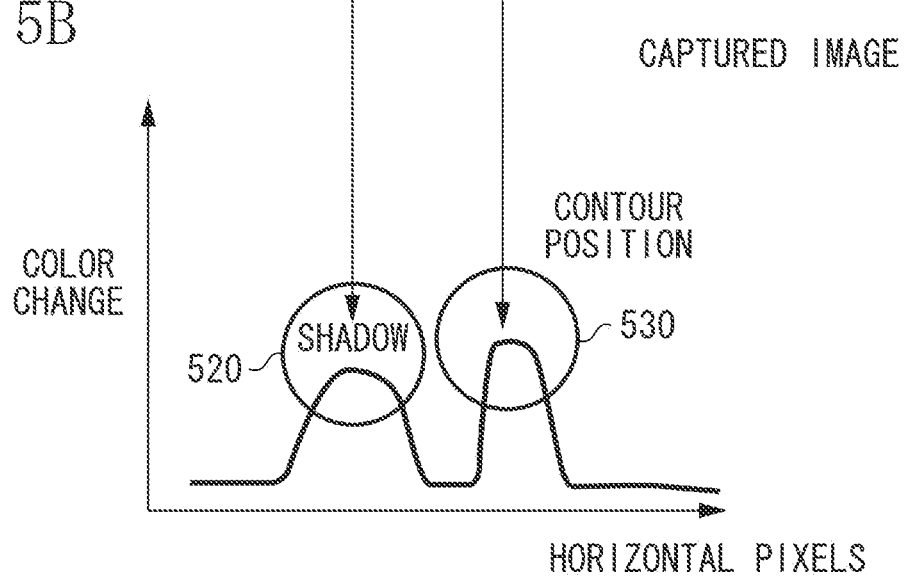

FIGS. 5A and 5B illustrate transitions of a depth and a color change, respectively, with respect to the same position on a depth image and a captured image. A horizontal axis represents horizontal pixels of the depth image (FIG. 5A) and the captured image (FIG. 5B), and a vertical axis represents the depth of the depth image (FIG. 5A) and a value of the color change of the captured image (FIG. 5B). If a shadow area is present at a position 520 illustrated in FIG. 5B, a color change occurs on the captured image, while no change occurs on the depth image. A position (510) with a large depth change on the depth image illustrated in FIG. 5A is located in the vicinity of the contour position of the actual hand. Accordingly, the gradient image generation unit 1080 acquires a depth image, which makes it possible to estimate the contour position with no influence of a shadow. However, the accuracy of extracting a depth image may be low depending on sensor characteristics. Accordingly, if the contour position is determined based only on the depth image, an accurate contour position cannot be obtained. Therefore, the actual contour position can be determined by searching for a position (530) with a large color change with respect to a proximity position from the captured image acquired by the gradient image generation unit 1080, and the contour position can be accurately corrected.

FIG. 6 illustrates an evaluation function for a method of processing data acquired from the distance measurement apparatus and the image capturing apparatus. This evaluation function is provided with weighting coefficients W1 and W2 for prioritizing color information (col) and depth information (dep), respectively.

A method for giving a weight to the function illustrated in FIG. 6 will be described. As illustrated in the processing flow of FIG. 2, first, a rough hand contour position is estimated based on the depth information, and then the contour position is determined based on the color information. In a case where the weighted evaluation function is implemented in this processing flow, when a search point is present within the hand area or outside the hand area (at a position other than the contour position), a depth change on the depth image is small, and thus the weight for the depth image is increased and the weight for the color information is decreased. This indicates that the contour position of the actual hand is estimated based on gradient data on the depth image. On the contrary, when a depth change on the depth image is large (contour position), the weight for the depth image can be decreased and the weight for the color information can be increased. This indicates that the contour position is estimated based on a color change so that the contour position estimated based on the gradient data on the depth image can be more accurately estimated. The evaluation function and the weighting method as described above are illustrated by way of example only, and the present disclosure is not limited to these examples.

Figure 7:
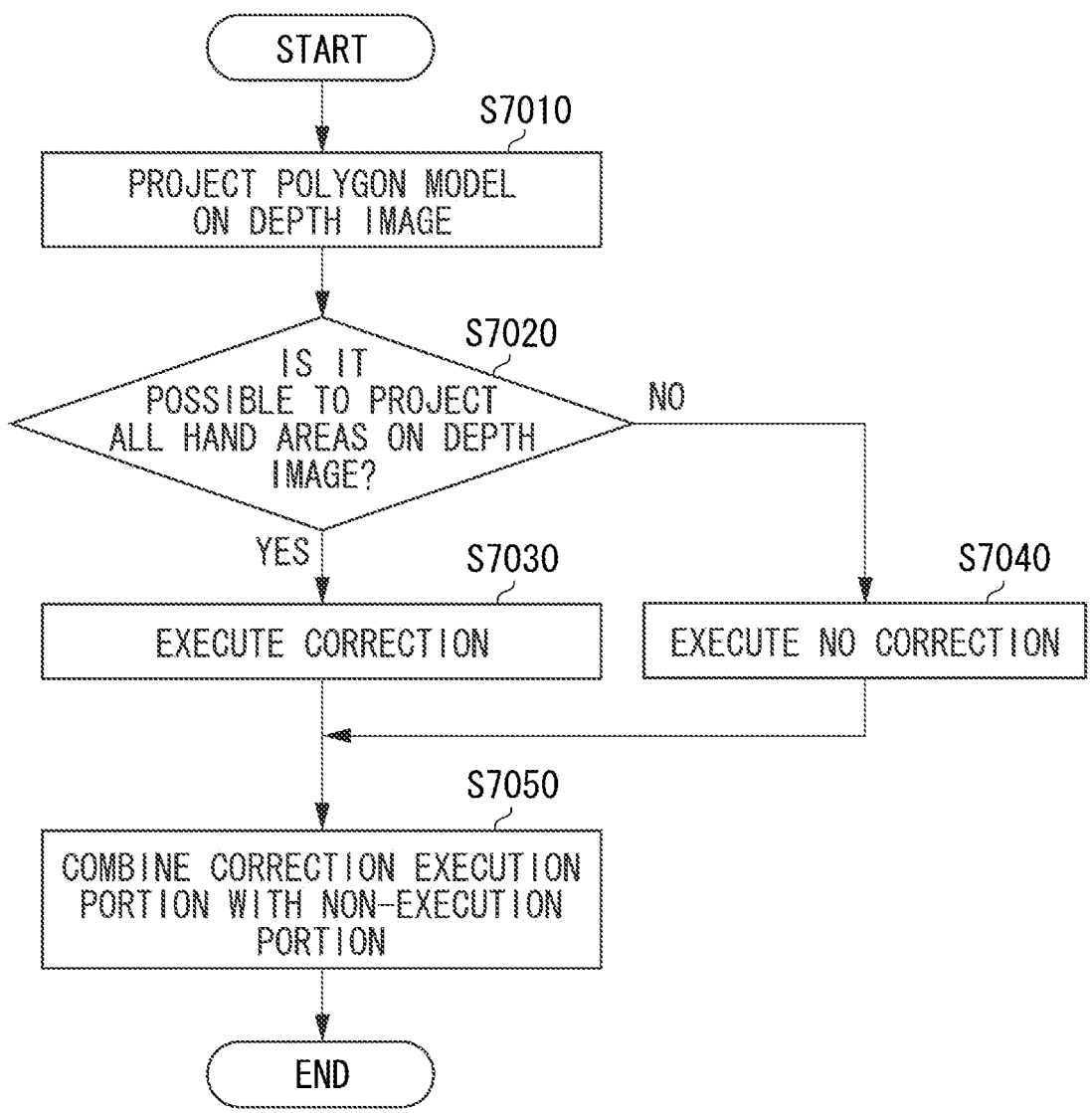
FIG. 7 is a flowchart illustrating an operation of a depth image projection unit according to one or more aspects of the present disclosure t.
Figure 8:
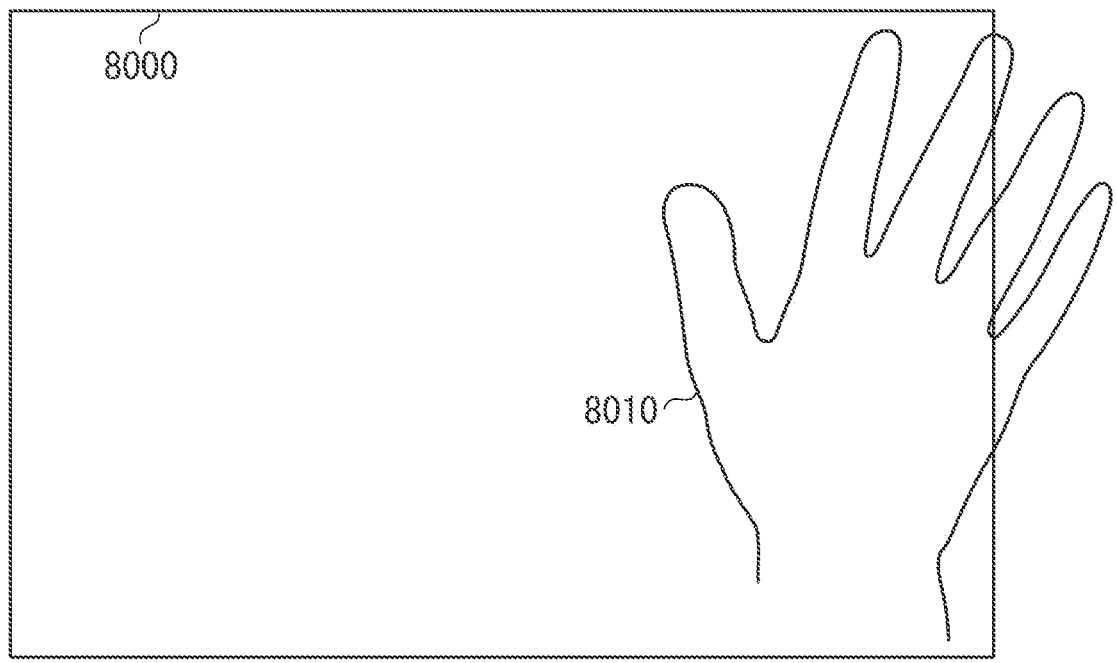
FIG. 8 illustrates a state where not all of a hand area cannot be projected on a depth image according to one or more aspects of the present disclosure.

FIG. 7 illustrates a processing flow when the polygon model cannot be projected on the depth image. The exemplary embodiment described above is based on the premise that all hand areas can be projected on the depth image. However, even when the hand is displayed within the range of the captured image, the hand cannot be displayed on the depth image depending on an angle of view, a layout, or the like. An example of this case is illustrated in FIG. 8. FIG. 8 illustrates that the polygon model generated by the polygon model generation unit 1040 is projected by the polygon model projection unit 1070 on a depth image 8000. A line 8010 indicates the contour of the polygon model. In this case, not all hand areas cannot be projected.

In step S7010, the polygon model of the hand is projected on the depth image, and in step S7020, it is determined whether all hand areas can be projected on the depth image. In a case where all hand areas can be projected (YES in step S7020), then in step S7030, the processing illustrated in FIG. 2 is carried out. In a case where there is a hand area that cannot be projected, then in step S7040, no correction is executed in the range of the hand area. Specifically, in the range in which hand areas can be projected on the depth image, a correction is executed in the processing flow (in FIG. 2) proposed herein, and in the range in which the hand is not displayed on the depth image, hand areas are extracted by the extraction method using the preliminarily registered skin color, and then in step S7050, the extracted areas are combined.

Figure 9:
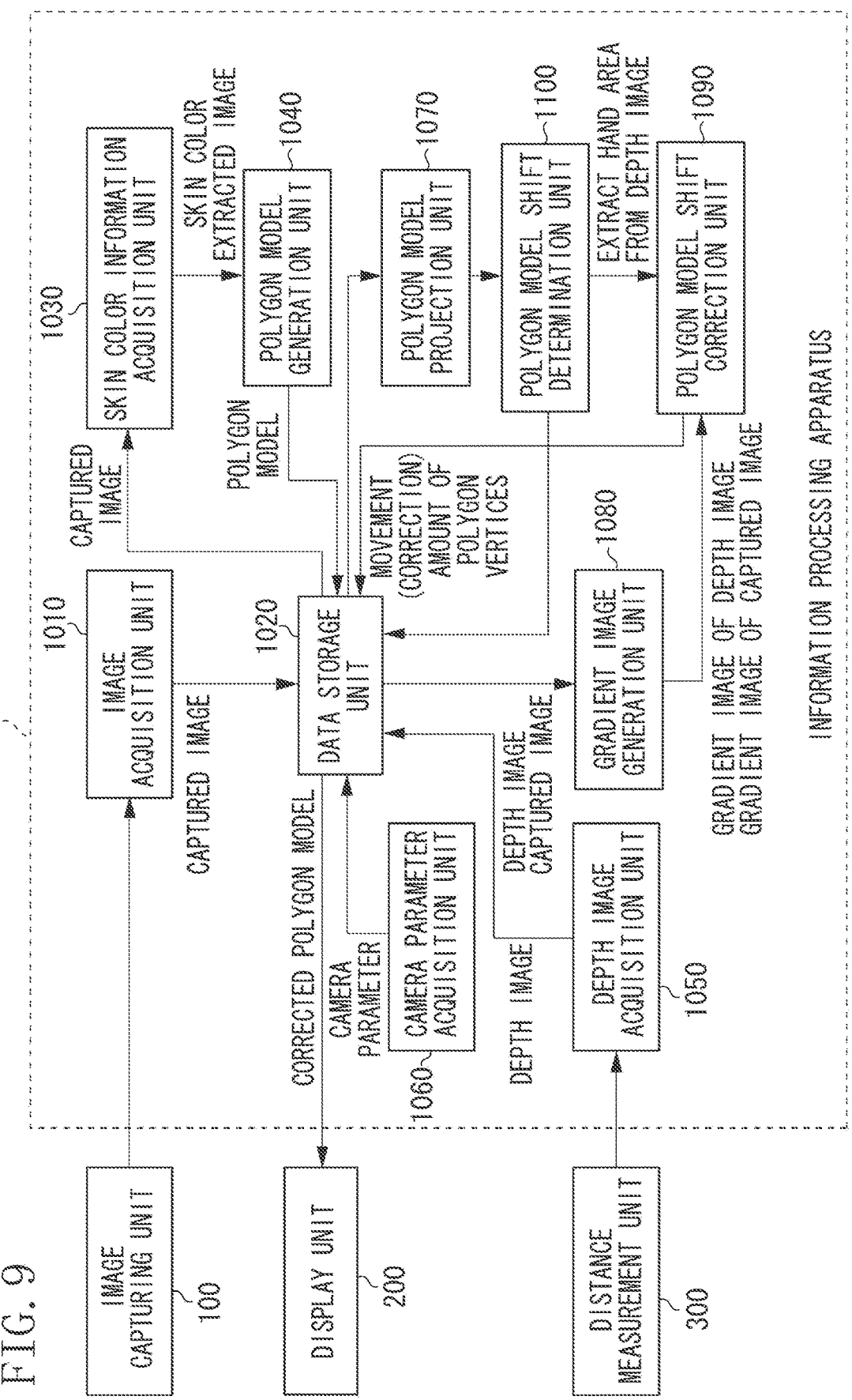
FIG. 9 is a block diagram illustrating a functional configuration example of a system according to one or more aspects of the present disclosure.

FIG. 9 is a block diagram illustrating an information processing apparatus 2000 that controls an image capturing apparatus and a distance measurement apparatus according to a second exemplary embodiment.

The present exemplary embodiment illustrates a configuration in which a polygon model shift determination unit 1100 is added to the configuration illustrated in FIG. 1.

Figure 10:
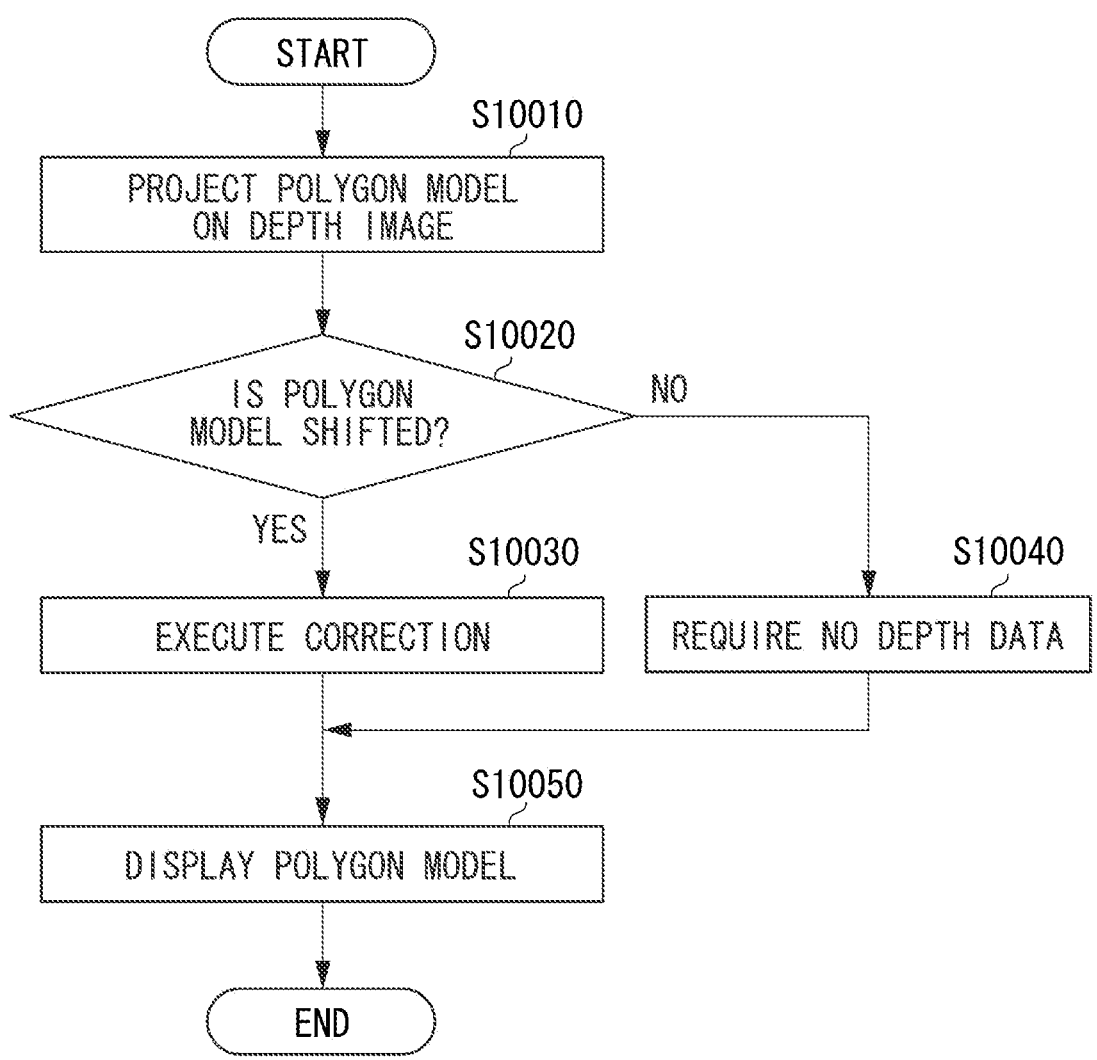
FIG. 10 is a flowchart illustrating an operation of a polygon model shift determination unit according to one or more aspects of the present disclosure.

The polygon model shift determination unit 1100 determines whether a polygon model projected by the polygon model projection unit 1070 is shifted from a position of an actual hand. FIG. 10 illustrates a processing flow of this processing. In step S10010, the polygon model is projected on a depth image, and in step S10020, it is determined whether the generated polygon model matches the actual hand. As an example of the method for determining whether the polygon model is shifted from the position of the actual hand, there is a method in which if a pixel position with a large depth change on a depth image matches a pixel position with a large color change on a captured image, it is determined that the polygon model matches the actual hand. However, in a case where a shift occurs between pixels due to different resolutions, or a shift occurs between pixels due to the projection and the polygon model does not completely match the actual hand, if the pixel shift is equal to or less than a threshold, it can be determined that the polygon model matches the actual hand. In a case where it is determined that the polygon model is shifted in step S10020 (YES in step S10020), the same configuration as that of the first exemplary embodiment is applied and processing (S2030 and S2040) similar to the processing described above is carried out in step S10030. In a case where it is determined that the polygon model is not shifted (NO in step S10020), there is no need for correction. Accordingly, in step S10040, processing required for correction is interrupted. Lastly, in step S10050, the corrected polygon model or the polygon model with no correction is displayed.

In the present exemplary embodiment, if the polygon model shift determination unit 1100 determines that the polygon model is not shifted, there is a period during which data on the depth image is not required. Therefore, the depth image data is not used depending on the determination result of the polygon model shift determination unit 1100, which leads to a reduction in the entire data processing amount.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-166095, filed Aug. 30, 2017, which is hereby incorporated by reference herein in its entirety.

What is claimed is:

1. An information processing apparatus comprising:
one or more processors; and
at least one memory storing executable instructions, which when executed by the one or more processors, cause the information processing apparatus to:
acquire depth information from a measurement apparatus that has measured a distance to an object;
acquire a captured image from an image capturing apparatus that has captured an image of the object;
acquire information about a contour of the object from the captured image;
estimate a contour position of the object based on the information about the contour of the object and depth gradient data corresponding to the contour position on the depth information;
correct the estimated contour position of the object based on color gradient data corresponding to the contour position on the captured image; and
estimate a shape of the object based on the corrected contour position of the object.

2. The information processing apparatus according to claim 1, wherein the object is a hand.

3. The information processing apparatus according to claim 1, wherein the instructions, when executed by the one or more processors, further cause the information processing apparatus to:
project a polygon model representing an area of the object on the depth information, the polygon model being generated based on the information about the contour of the object.

4. The information processing apparatus according to claim 1, wherein the instructions, when executed by the one or more processors, further cause the information processing apparatus to:
in accordance with estimating the contour position of the object based on the depth gradient data on the depth information, correct the information about the contour of the object by moving information representing the contour of the object to the estimated contour position.

5. The information processing apparatus according to claim 1, wherein correcting the estimated contour position of the object based on the color gradient data includes acquiring, from a gradient image of the captured image, the color gradient data corresponding to the contour position, the color gradient data indicating a color change with respect to adjacent pixels on the gradient image of the captured image.

6. The information processing apparatus according to claim 1, wherein the instructions, when executed by the one or more processors, further cause the information processing apparatus to:
process the depth information and the captured image based on an evaluation function for prioritizing each of a gradient of a depth of the depth information and a gradient of a color of the captured image.

7. The information processing apparatus according to claim 1, wherein no correction is executed on the information about the contour of the object in an area in which the depth information is not present.

8. The information processing apparatus according to claim 1, further comprising a display unit configured to display the estimated shape of the object.

9. The information processing apparatus according to claim 2, wherein the information about the contour of the object is acquired based on information about a skin color of the captured image.

10. The information processing apparatus according to claim 8, wherein the display unit causes a head mounted display (HMD) to display the estimated shape of the object.

11. An information processing method comprising:
acquiring depth information from a measurement apparatus that has measured a distance to an object;
acquiring a captured image from an image capturing apparatus that has captured an image of the object;
acquiring information about a contour of the object from the captured image;
estimating a contour position of the object based on the information about the contour of the object and depth gradient data corresponding to the contour position on the depth information;
correcting the estimated contour position of the object based on color gradient data corresponding to the contour position on the captured image; and
estimating a shape of the object based on the corrected contour position of the object.

12. The information processing method according to claim 11, wherein the object is a hand.

13. The information processing method according to claim 11, further comprising:
projecting a polygon model representing an area of the object on the depth information, the polygon model being generated based on the information about the contour of the object.

14. The information processing method according to claim 11, further comprising:
in accordance with estimating the contour position of the object based on the depth gradient data on the depth information, correcting the information about the contour of the object by moving information representing the contour of the object to the estimated contour position.

15. The information processing method according to claim 11, wherein correcting the estimated contour position of the object based on the color gradient data includes acquiring, from a gradient image of the captured image, the color gradient data corresponding to the contour position, the color gradient data indicating a color change with respect to adjacent pixels on the gradient image of the captured image.

16. The information processing method according to claim 11, further comprising:
processing the depth information and the captured image based on an evaluation function for prioritizing each of a gradient of a depth of the depth information and a gradient of a color of the captured image.

17. The information processing method according to claim 11, wherein no correction is executed on the information about the contour of the object in an area in which the depth information is not present.

18. The information processing method according to claim 11, wherein the estimated shape of the object is displayed.

19. The information processing method according to claim 12, wherein the information about the contour of the object is acquired based on information about a skin color of the captured image.

20. A non-transitory storage medium storing a program causing a computer to execute an information processing method for estimating a shape of an object, the information processing method comprising:
acquiring depth information from a measurement apparatus that has measured a distance to the object;
acquiring a captured image from an image capturing apparatus that has captured an image of the object;
acquiring information about a contour of the object from the captured image;
estimating a contour position of the object based on the information about the contour of the object and depth gradient data corresponding to the contour position on the depth information;
correcting the estimated contour position of the object based on color gradient data corresponding to the contour position on the captured image; and
estimating the shape of the object based on the corrected contour position of the object.

21. An information processing apparatus comprising:
one or more processors; and
at least one memory storing executable instructions, which when executed by the one or more processors, cause the information processing apparatus to:
acquire depth information from a measurement apparatus that has measured a distance to an object;
acquire a captured image from an image capturing apparatus that has captured an image of the object; and
estimate a contour position of the object based on a color gradient in the captured image, for a local area where a depth gradient in the depth information is large.

22. The information processing apparatus according to claim 21, wherein, in the estimating, regarding a position where the color gradient is greater than a predetermined value, a position where the depth gradient is not less than a predetermined value is estimated as the contour position, and a position where the depth gradient is less than the predetermined value is estimated as a position included in the object.

* * * * *